(12) United States Patent
Jeddeloh et al.

(10) Patent No.: US 7,437,579 B2
(45) Date of Patent: *Oct. 14, 2008

(54) SYSTEM AND METHOD FOR SELECTIVE MEMORY MODULE POWER MANAGEMENT

(75) Inventors: Joseph M. Jeddeloh, Shoreview, MN (US); Terry Lee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/433,218

(22) Filed: May 11, 2006

(65) Prior Publication Data

US 2006/0206738 A1 Sep. 14, 2006

Related U.S. Application Data

(63) Continuation of application No. 10/601,222, filed on Jun. 20, 2003.

(51) Int. Cl.
*G06F 1/00* (2006.01)
*G06F 1/26* (2006.01)
*G06F 1/32* (2006.01)
*G06F 11/30* (2006.01)

(52) U.S. Cl. ............ 713/300; 713/320; 713/323; 713/324; 713/330; 713/340

(58) Field of Classification Search ............ 713/300
See application file for complete search history.

(56) References Cited

U.S. PATENT DOCUMENTS 3,742,253 A 6/1973 Kronies ............ 307/247

4,045,781 A 8/1977 Levy et al. ............ 364/200

(Continued)

FOREIGN PATENT DOCUMENTS

EP 0849685 A2 6/1998

(Continued)

OTHER PUBLICATIONS

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

(Continued)

*Primary Examiner*—Rehana Perveen
*Assistant Examiner*—Michael J Brown
(74) *Attorney, Agent, or Firm*—Dorsey & Whitney LLP

(57) ABSTRACT

A memory module includes a memory hub that monitors utilization of the memory module and directs devices of the memory module to a reduced power state when the module is not being used at a desired level. System utilization of the memory module is monitored by tracking system usage, manifested by read and write commands issued to the memory module, or by measuring temperature changes indicating a level of device activity beyond normal refresh activity. Alternatively, measured activity levels can be transmitted over a system bus to a centralized power management controller which, responsive to the activity level packets transmitted by remote memory modules, direct devices of those remote memory modules to a reduced power state. The centralized power management controller could be disposed on a master memory module or in a memory or system controller.

87 Claims, 6 Drawing Sheets

U.S. PATENT DOCUMENTS

| | | | |
|---|---|---|---|
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,608,702 A | 8/1986 | Hirzel et al. | 375/110 |
| 4,641,249 A | 2/1987 | Gion et al. | 364/496 |
| 4,707,823 A | 11/1987 | Holdren et al. | 370/1 |
| 4,724,520 A | 2/1988 | Athanas et al. | 364/200 |
| 4,831,520 A | 5/1989 | Rubinfeld et al. | 364/200 |
| 4,891,808 A | 1/1990 | Williams | 370/112 |
| 4,930,128 A | 5/1990 | Suzuki et al. | 371/12 |
| 4,953,930 A | 9/1990 | Ramsey et al. | 350/96.11 |
| 4,989,113 A | 1/1991 | Asal | 364/200 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,269,022 A | 12/1993 | Shinjo et al. | 395/700 |
| 5,313,590 A | 5/1994 | Taylor | 395/325 |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | 395/575 |
| 5,355,391 A | 10/1994 | Horowitz et al. | 375/36 |
| 5,388,265 A * | 2/1995 | Volk | 713/322 |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,446,741 A | 8/1995 | Boldt et al. | 371/21.1 |
| 5,461,627 A | 10/1995 | Rypinski | 370/95.2 |
| 5,465,229 A | 11/1995 | Bechtolsheim et al. | 345/477 |
| 5,479,370 A | 12/1995 | Furuyama et al. | 365/189.12 |
| 5,497,476 A | 3/1996 | Oldfield et al. | 395/439 |
| 5,502,621 A | 3/1996 | Schumacher et al. | 361/760 |
| 5,544,319 A | 8/1996 | Acton et al. | 395/200.07 |
| 5,546,591 A | 8/1996 | Wurzburg et al. | 395/750 |
| 5,566,325 A | 10/1996 | Bruce, II et al. | 395/494 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,621,883 A | 4/1997 | Thoulon et al. | 395/182.07 |
| 5,638,334 A | 6/1997 | Farmwald et al. | 365/230.03 |
| 5,638,534 A | 6/1997 | Mote, Jr. | 395/485 |
| 5,644,784 A | 7/1997 | Peek | 395/844 |
| 5,659,798 A | 8/1997 | Blumrich et al. | 395/846 |
| 5,687,325 A | 11/1997 | Chang | 395/284 |
| 5,706,224 A | 1/1998 | Srinivasan et al. | 365/49 |
| 5,710,733 A | 1/1998 | Chengson et al. | 365/52 |
| 5,715,456 A | 2/1998 | Bennett et al. | 395/652 |
| 5,729,709 A | 3/1998 | Harness | 395/405 |
| 5,748,616 A | 5/1998 | Riley | 370/242 |
| 5,796,413 A | 8/1998 | Shipp et al. | 345/522 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,881,072 A | 3/1999 | Dell | 371/40.11 |
| 5,887,159 A | 3/1999 | Burrows | 395/567 |
| 5,889,714 A | 3/1999 | Schumann et al. | 365/203 |
| 5,893,089 A | 4/1999 | Kikinis | 707/3 |
| 5,928,343 A | 7/1999 | Farmwald et al. | 710/104 |
| 5,944,800 A | 8/1999 | Mattheis et al. | 710/23 |
| 5,963,942 A | 10/1999 | Igata | 707/6 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,011,741 A | 1/2000 | Wallace et al. | 365/221 |
| 6,023,726 A | 2/2000 | Saksena | 709/219 |
| 6,023,738 A | 2/2000 | Priem et al. | 710/23 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,038,630 A | 3/2000 | Foster et al. | 710/132 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,067,649 A | 5/2000 | Goodwin | 714/718 |
| 6,073,190 A | 6/2000 | Rooney | 710/56 |
| 6,076,139 A | 6/2000 | Welker et al. | 711/104 |
| 6,079,008 A | 6/2000 | Clery, III | 712/11 |
| 6,092,158 A | 7/2000 | Harriman et al. | 711/151 |
| 6,098,158 A | 8/2000 | Lay et al. | 711/162 |
| 6,105,075 A | 8/2000 | Ghaffari | 710/5 |
| 6,111,757 A | 8/2000 | Dell et al. | 361/737 |
| 6,118,719 A * | 9/2000 | Dell et al. | 365/222 |
| 6,125,431 A | 9/2000 | Kobayashi | 711/154 |
| 6,128,703 A | 10/2000 | Bourekas et al. | 711/138 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,185,676 B1 | 2/2001 | Poplingher et al. | 712/239 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 | 3/2001 | Fisch et al. | 327/141 |
| 6,219,725 B1 | 4/2001 | Diehl et al. | 710/26 |
| 6,223,301 B1 | 4/2001 | Santeler et al. | 714/6 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,692 B1 | 7/2001 | Yoda et al. | 710/104 |
| 6,266,730 B1 | 7/2001 | Perino et al. | 710/126 |
| 6,272,609 B1 | 8/2001 | Jeddeloh | 711/169 |
| 6,275,914 B1 | 8/2001 | Jeddeloh | 711/158 |
| 6,285,349 B1 | 9/2001 | Smith | 345/147 |
| 6,286,083 B1 | 9/2001 | Chin et al. | 711/151 |
| 6,294,937 B1 | 9/2001 | Crafts et al. | 327/158 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,367,074 B1 | 4/2002 | Bates et al. | 717/11 |
| 6,370,068 B2 | 4/2002 | Rhee | 365/196 |
| 6,370,601 B1 | 4/2002 | Baxter | 710/65 |
| 6,370,611 B1 | 4/2002 | Callison et al. | 711/105 |
| 6,373,777 B1 | 4/2002 | Suzuki | 365/230.03 |
| 6,381,190 B1 | 4/2002 | Shinkai | 365/230.03 |
| 6,389,514 B1 | 5/2002 | Rokicki | 711/136 |
| 6,392,653 B1 | 5/2002 | Malandain et al. | 345/501 |
| 6,401,149 B1 | 6/2002 | Dennin et al. | 710/58 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,433,785 B1 | 8/2002 | Garcia et al. | 345/531 |
| 6,434,639 B1 | 8/2002 | Haghighi | 710/39 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |

| | | | |
|---|---|---|---|
| 6,457,116 B1 | 9/2002 | Mirsky et al. ................. 712/16 |
| 6,460,114 B1 | 10/2002 | Jeddeloh ..................... 711/120 |
| 6,462,978 B2 | 10/2002 | Shibata et al. ................. 365/63 |
| 6,463,059 B1 | 10/2002 | Movshovich et al. ....... 370/389 |
| 6,470,422 B2 | 10/2002 | Cai et al. ..................... 711/129 |
| 6,473,828 B1 | 10/2002 | Matsui ........................ 711/104 |
| 6,477,592 B1 | 11/2002 | Chen et al. .................... 710/52 |
| 6,477,614 B1 * | 11/2002 | Leddige et al. ................. 711/5 |
| 6,477,621 B1 | 11/2002 | Lee et al. .................... 711/120 |
| 6,479,322 B2 | 11/2002 | Kawata et al. .............. 438/109 |
| 6,487,556 B1 | 11/2002 | Downs et al. ................ 707/101 |
| 6,490,188 B2 | 12/2002 | Nuxoll et al. ................. 365/63 |
| 6,493,803 B1 | 12/2002 | Pham et al. .................. 711/147 |
| 6,496,193 B1 | 12/2002 | Surti et al. ................... 345/552 |
| 6,496,909 B1 | 12/2002 | Schimmel ................... 711/163 |
| 6,501,471 B1 | 12/2002 | Venkataraman et al. ..... 345/424 |
| 6,505,287 B2 | 1/2003 | Uematsu ..................... 711/170 |
| 6,523,092 B1 | 2/2003 | Fanning ...................... 711/134 |
| 6,523,093 B1 | 2/2003 | Bogin et al. ................. 711/137 |
| 6,526,483 B1 | 2/2003 | Cho et al. .................... 711/154 |
| 6,526,498 B1 | 2/2003 | Mirsky et al. ................. 712/11 |
| 6,539,490 B1 | 3/2003 | Forbes et al. ................ 713/401 |
| 6,552,564 B1 | 4/2003 | Forbes et al. .................. 326/30 |
| 6,553,479 B2 | 4/2003 | Mirsky et al. ................. 712/16 |
| 6,564,329 B1 | 5/2003 | Cheung et al. .............. 713/322 |
| 6,587,912 B2 | 7/2003 | Leddige et al. ................. 711/5 |
| 6,590,816 B2 | 7/2003 | Perner ......................... 365/200 |
| 6,594,713 B1 | 7/2003 | Fuoco et al. ................... 710/31 |
| 6,594,722 B1 | 7/2003 | Willke, II et al. ........... 710/313 |
| 6,598,154 B1 | 7/2003 | Vaid et al. ................... 712/237 |
| 6,615,325 B2 | 9/2003 | Mailloux et al. ............ 711/154 |
| 6,622,227 B2 | 9/2003 | Zumkehr et al. ............ 711/167 |
| 6,628,294 B1 | 9/2003 | Sadowsky et al. ........... 345/568 |
| 6,629,220 B1 | 9/2003 | Dyer ............................ 711/158 |
| 6,631,440 B2 | 10/2003 | Jenne et al. .................. 711/105 |
| 6,636,110 B1 | 10/2003 | Ooishi et al. ................. 327/565 |
| 6,646,929 B1 | 11/2003 | Moss et al. .................. 365/194 |
| 6,647,470 B1 | 11/2003 | Janzen ........................ 711/154 |
| 6,658,509 B1 | 12/2003 | Bonella et al. ............... 710/100 |
| 6,662,304 B2 | 12/2003 | Keeth et al. .................. 713/400 |
| 6,665,202 B2 | 12/2003 | Lindahl et al. ................. 365/49 |
| 6,667,895 B2 | 12/2003 | Jang et al. ..................... 365/63 |
| 6,681,292 B2 | 1/2004 | Creta et al. .................. 711/119 |
| 6,697,926 B2 | 2/2004 | Johnson et al. ............. 711/167 |
| 6,715,018 B2 | 3/2004 | Farnworth et al. .......... 710/300 |
| 6,718,440 B2 | 4/2004 | Maiyuran et al. ........... 711/137 |
| 6,721,195 B2 | 4/2004 | Brunelle et al. ............... 365/63 |
| 6,724,685 B2 | 4/2004 | Braun et al. ................. 365/233 |
| 6,725,349 B2 | 4/2004 | Langendorf et al. ......... 711/170 |
| 6,728,800 B1 | 4/2004 | Lee et al. ....................... 710/54 |
| 6,735,679 B1 | 5/2004 | Herbst et al. ................ 711/167 |
| 6,735,682 B2 | 5/2004 | Segelken et al. ............ 711/220 |
| 6,745,275 B2 | 6/2004 | Chang ......................... 710/305 |
| 6,751,113 B2 | 6/2004 | Bhakta et al. ................. 365/63 |
| 6,751,703 B2 | 6/2004 | Chilton ........................ 711/113 |
| 6,751,722 B2 | 6/2004 | Mirsky et al. ................. 712/15 |
| 6,754,117 B2 | 6/2004 | Jeddeloh ..................... 365/201 |
| 6,754,812 B1 | 6/2004 | Abdallah et al. ............. 712/234 |
| 6,756,661 B2 | 6/2004 | Tsuneda et al. .............. 257/673 |
| 6,760,833 B1 | 7/2004 | Dowling ....................... 712/34 |
| 6,771,538 B2 | 8/2004 | Shukuri et al. ........... 365/185.05 |
| 6,775,747 B2 | 8/2004 | Venkatraman .............. 711/137 |
| 6,782,465 B1 | 8/2004 | Schmidt ...................... 711/208 |
| 6,785,780 B1 | 8/2004 | Klein et al. .................. 711/148 |
| 6,789,173 B1 | 9/2004 | Tanaka et al. ............... 711/147 |
| 6,792,059 B2 | 9/2004 | Yuan et al. ................... 375/354 |
| 6,792,496 B2 | 9/2004 | Aboulenein et al. ......... 710/306 |
| 6,795,899 B2 | 9/2004 | Dodd et al. .................. 711/137 |
| 6,799,246 B1 | 9/2004 | Wise et al. ................... 711/117 |
| 6,799,268 B1 | 9/2004 | Boggs et al. ................. 712/228 |
| 6,804,760 B2 | 10/2004 | Wiliams ...................... 711/170 |
| 6,804,764 B2 | 10/2004 | LaBerge et al. ............. 711/170 |
| 6,807,630 B2 | 10/2004 | Lay et al. ....................... 713/2 |
| 6,811,320 B1 | 11/2004 | Abbott .......................... 385/58 |
| 6,816,947 B1 | 11/2004 | Huffman ..................... 711/151 |
| 6,820,181 B2 | 11/2004 | Jeddeloh et al. ............. 711/169 |
| 6,821,029 B1 | 11/2004 | Grung et al. ................... 385/92 |
| 6,823,023 B1 | 11/2004 | Hannah ....................... 375/296 |
| 6,845,409 B1 | 1/2005 | Talagala et al. ............... 710/20 |
| 6,859,856 B2 | 2/2005 | Piau et al. .................... 711/103 |
| 6,889,304 B2 | 5/2005 | Perego et al. ................ 711/170 |
| 6,910,109 B2 | 6/2005 | Holman et al. .............. 711/156 |
| 6,947,050 B2 | 9/2005 | Jeddeloh ..................... 345/532 |
| 6,952,745 B1 | 10/2005 | Dodd et al. .................... 710/35 |
| 6,970,968 B1 | 11/2005 | Holman ......................... 711/5 |
| 7,007,130 B1 | 2/2006 | Holman ......................... 711/5 |
| 2001/0039612 A1 | 11/2001 | Lee ................................ 713/2 |
| 2002/0033276 A1 | 3/2002 | Dabral et al. ................ 174/262 |
| 2002/0112119 A1 | 8/2002 | Halbert et al. ............... 711/115 |
| 2002/0116588 A1 | 8/2002 | Beckert et al. ............... 711/161 |
| 2002/0144027 A1 | 10/2002 | Schmisseur .................. 710/22 |
| 2002/0144064 A1 | 10/2002 | Fanning ...................... 711/144 |
| 2002/0178319 A1 | 11/2002 | Sanchez-Olea ............. 710/305 |
| 2003/0005223 A1 | 1/2003 | Coulson et al. .............. 711/118 |
| 2003/0023840 A1 | 1/2003 | Zitlaw et al. ................... 713/1 |
| 2003/0043158 A1 | 3/2003 | Wasserman et al. ......... 345/545 |
| 2003/0043426 A1 | 3/2003 | Baker et al. ................. 359/109 |
| 2003/0065836 A1 | 4/2003 | Pecone ......................... 710/62 |
| 2003/0093630 A1 | 5/2003 | Richard et al. .............. 711/154 |
| 2003/0095559 A1 | 5/2003 | Sano et al. ................... 370/419 |
| 2003/0149809 A1 | 8/2003 | Jensen et al. .................. 710/22 |
| 2003/0163649 A1 | 8/2003 | Kapur et al. ................. 711/146 |
| 2003/0177320 A1 | 9/2003 | Sah et al. ..................... 711/158 |
| 2003/0193927 A1 | 10/2003 | Hronik ......................... 370/351 |
| 2003/0217223 A1 | 11/2003 | Nino, Jr. et al. ............. 711/105 |
| 2003/0227798 A1 | 12/2003 | Pax ......................... 365/189.12 |
| 2003/0229762 A1 | 12/2003 | Maiyuran et al. ........... 711/137 |
| 2003/0229770 A1 | 12/2003 | Jeddeloh ..................... 711/213 |
| 2003/0235099 A1 | 12/2003 | Mori et al. ................... 365/202 |
| 2004/0008545 A1 | 1/2004 | Korotkov et al. ........ 365/189.05 |
| 2004/0022094 A1 | 2/2004 | Radhakrishnan et al. .... 365/200 |
| 2004/0024959 A1 | 2/2004 | Taylor ......................... 711/105 |
| 2004/0044833 A1 | 3/2004 | Ryan .............................. 711/5 |
| 2004/0047169 A1 | 3/2004 | Lee et al. ....................... 365/63 |
| 2004/0064602 A1 | 4/2004 | George ......................... 710/22 |
| 2004/0126115 A1 | 7/2004 | Levy et al. ................... 398/116 |
| 2004/0144994 A1 | 7/2004 | Lee et al. ..................... 257/200 |
| 2004/0199730 A1 | 10/2004 | Eggers et al. ................ 711/154 |
| 2004/0216018 A1 | 10/2004 | Cheung ....................... 714/724 |
| 2004/0236885 A1 | 11/2004 | Fredriksson et al. ........ 710/100 |
| 2004/0243769 A1 | 12/2004 | Frame et al. ................. 711/148 |
| 2004/0260957 A1 * | 12/2004 | Jeddeloh et al. ............. 713/300 |
| 2005/0021884 A1 | 1/2005 | Jeddeloh ....................... 710/22 |
| 2005/0033874 A1 | 2/2005 | Futral et al. ................... 710/22 |
| 2005/0044327 A1 | 2/2005 | Howard et al. .............. 711/147 |
| 2005/0050237 A1 | 3/2005 | Jeddeloh ....................... 710/10 |
| 2005/0066136 A1 | 3/2005 | Schnepper .................. 711/154 |
| 2005/0071542 A1 | 3/2005 | Weber et al. ................. 711/105 |
| 2005/0146943 A1 | 7/2005 | Jeddeloh ................. 365/189.05 |
| 2005/0146944 A1 | 7/2005 | Jeddeloh ................. 365/189.05 |
| 2005/0160201 A1 | 7/2005 | Jeddeloh ....................... 710/22 |
| 2005/0177755 A1 * | 8/2005 | Fung ........................... 713/300 |
| 2006/0200620 A1 | 9/2006 | Schnepper .................. 711/103 |

FOREIGN PATENT DOCUMENTS

| | | |
|---|---|---|
| JP | 2001265539 A | 9/2001 |
| WO | WO 93/19422 | 9/1993 |
| WO | WO 98/57489 | 12/1998 |
| WO | 99/26139 | 5/1999 |
| WO | WO 02/27499 A2 | 4/2002 |

OTHER PUBLICATIONS

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Jones, R. "Throughput Expansion with FET Based Crossbar Switching", Pericom, Application Note 45, Nov. 12, 2001, pp. 1-5.

Micron Technology, Inc., "Synchronous DRAM Module 512MB/1GB (X72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

* cited by examiner

SYSTEM AND METHOD FOR SELECTIVE MEMORY MODULE POWER MANAGEMENT

CROSS-REFERENCE TO RELATED APPLICATION

This application is a continuation of pending U.S. patent application Ser. No. 10/601,222, filed Jun. 20, 2003.

TECHNICAL FIELD

This invention relates to computer memory systems. More particularly, the present invention relates to enhancing power management and reducing power consumption in a computer memory system.

BACKGROUND OF THE INVENTION

Most computers and other digital systems have a system memory which often consists of dynamic random access memory ("DRAM") devices. DRAM devices are fairly inexpensive because a DRAM memory cell needs relatively few components to store a data bit as compared with other types of memory cells. Thus, a large system memory can be implemented using DRAM devices for a relatively low cost.

Commonly, DRAM devices are arranged on memory modules, such as single in-line memory modules ("SIMMs") and dual in-line memory modules ("DIMMs"). A representative module is shown in FIG. 1. The module 100 features a number of DRAM devices 104 mounted on an insulative substrate 108 through which the DRAM devices 104 are operably coupled through communications lines 110 such as conductive traces or other similar signal carrying devices to a memory hub 112. The module 100 interfaces with a system (not shown) through a series of conductive terminals 116 or other means through which control, data, and address information is communicated between the system and the module 100. A typical memory module 100 may support a number of DRAM devices 104 which supports an array of single-bit storage devices. A number of these DRAM devices 104 are arrayed in a parallel fashion such that, upon the module 100 receiving a specified address, the memory hub 112 will cause a data bit stored at the same address in each of the array of memory devices 104 to be retrieved to effectively retrieve a full data word. For example, if the memory module 100 features eight DRAM devices 104, each address applied to the module 100, the memory hub 112 will cause an eight-bit byte to be retrieved from the DRAM devices 104.

The proliferation of this modular design has a number of advantages, ranging from the ability to provide a large memory capacity in a relatively small package to greatly simplifying the installation process as compared to the painstaking process of installing individual memory chips. Beyond these more obvious advantages of modular design, however, is the additional functionality which is made possible by the use of the memory hub 112 (FIG. 1). To name one example, the memory hub 112 can include one or more registers, allowing address, data, and/or control information to be latched. The latching of this information allows for synchronous operations using this information without concern for data transiency problems such as race, skew, or synchronization problems which might result if the module had to be perfectly in synchronization with the system bus in receiving and outputting data. In addition, computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Continually, new techniques are being developed to exploit the control permitted by the presence of the memory hub 112 central control logic on these memory modules 100.

Returning to the DRAM devices themselves, while DRAM devices do provide a relatively inexpensive way to provide a large system memory, DRAM devices suffer from the disadvantage that their memory cells must be continually refreshed. Refreshing memory cells consumes an appreciable quantity of power. Because of this drain of power, an important topic in DRAM design is how to reduce the power consumed in refreshing DRAM cells.

Once such technique for reducing power consumption is the implementation of a self-refresh cycle. FIG. 2 depicts a block diagram of a conventional DRAM device 200 enabled to use self-refresh. The DRAM device 200 is accessed through the address lines 210, the data lines 212, and a number of control lines 220-232. These control lines include CKE (clock enable) 220, CK* (clock signal-low) 222, CK (clock signal) 224, CS* (chip select-low enable) 226, WE* (write select -low enable) 228, CAS* (column address strobe-low enable) 230, and RAS* (row address strobe-low enable) 230. The address lines 210, data lines 212, and control lines 220-232, enable the system to read and write data to the actual memory banks 250, as well as control the refreshing of the DRAM device 200. The control logic 260 controls the read, write, and refresh operations of the DRAM device 200. The control logic 260 directs the operations of the DRAM device 200 as a function of the signals received at the control lines 220-232.

A DRAM device 200 typically is refreshed using an auto-refresh cycle, which is triggered by the system and operates synchronously with the system clock. More specifically, with the CKE 220 and WE* 228 control lines driven high, and the CS* 226, RAS* 230 and CAS* 232 control lines driven low, the rising edge of the next clock signal initiates an auto-refresh of the next row of the memory banks 250. Once the system initiates an auto-refresh cycle, the refresh counter 270 is incremented by one, and the row of the memory banks 250 corresponding to the updated count stored in the refresh counter 270 is refreshed. The refresh counter 270 maintains its count to track what row is next to be refreshed when the next auto-refresh cycle is initiated. This process repeats continuously. In a typical DRAM, having 4,096 rows and a maximum refresh interval of 64 milliseconds in its operational mode, a command to refresh one row would have to be issued approximately every 15 to 16 microseconds.

Although the auto-refresh process is a relatively simple one, auto-refresh requires that hundreds or thousands of times per second, thousands of control logic and access transistors within the devices depicted in FIG. 2 and described in the foregoing description must be energized to refresh the array, consuming power. In addition, resistance of the conductors through the memory array to address each and every transistor in each and every row consumes even more power. Still more power is consumed by transistors used in the sense amplifiers which read and refresh the memory cells in respective columns. Moreover, power is needed to actually charge each of the thousands of capacitors storing data bits in the array.

Implementation of a self-refresh cycle saves some of the power consumed as compared with auto-refresh. Initiation of a self-refresh cycle places a DRAM device 200 in a continual, indefinite refresh cycle to preserve the data stored in the DRAM device 200. A self-refresh command typically is issued during a period when useful read and write requests will not be forthcoming, for example, when a user has placed the computing system into a sleep or standby mode. A self-refresh command is triggered by driving the CS* 226, RAS* 230 and the CAS* 232 control lines low, driving the WE* 228 control line high, and, this time, driving the CKE 220 control line low. This command causes the self-refresh control logic 280 to periodically and repeatedly refresh every one of its rows, and also places all data, address, and control lines into a "don't care" state, with the exception of the CKE 220 control line. Driving the CKE 220 control line high ends the self-refresh state, removing the other control lines out of the "don't care" state.

During a self-refresh cycle, with most of the control lines in a don't care state, devices in the DRAM device 200 will not be switching to decode memory addresses and perform read or write commands, thus current and voltage fluctuations in the DRAM device 200 are reduced. This relatively stable condition tends to ameliorate electrical and thermal effects which contribute to current leakage from the capacitors of the memory cells. As a result, while the memory cells still need to be refreshed to preserve the integrity of the data stored therein, the memory cells do not need to be refreshed as frequently as during an operational state. During self-refresh, the contents of the memory cells can be preserved by refreshing a row less frequently than required during normal operation. In self-refresh state, for example, the rows might not need to be refreshed for a period up to twice as long, or perhaps slightly longer, than is permitted during an operational state.

While self-refresh can save an appreciable amount of power, self-refresh traditionally is implemented on a system-wide basis, often along with other power-saving techniques: For example, when a computer is placed in a standby mode, virtually every device in the computer enters a standby mode, i.e., the display is shut down, the hard disk is stopped, the memory is placed in a self-refresh state, and other systems are similarly put to "sleep."

Operating systems, such as Windows 2000® do allow for more advanced power management options, and a user can select an interval of disuse after which the hard disk, the display, and the entire system will power down. In addition, some operating systems or utilities provide for additional power management choices allowing a user to choose operating parameters ranging between maximum performance at one extreme and maximum power savings at another extreme, or some intermediate compromise choice to suit the user's preferences. Still, while all these options save power, the only means to avoid wasting power in system memory remains an all or nothing, standby or not proposition.

What is needed is a way to save power which might be wasted in system memory. It is to this end that the present invention is directed.

SUMMARY OF THE INVENTION

A memory module is equipped with means to monitor utilization of the memory module. Through these devices, system utilization of the memory module can be monitored by tracking actual system usage, such in the form of read and write commands issued to the memory module, or by measuring temperature changes that indicate a nominal level of read and write activity beyond continual refresh activity. According to one aspect of the invention, control logic on the memory module directs the memory module into a power saving mode after determining, responsive to current activity levels, that the module need not remain immediately ready to process memory commands. In accordance with another aspect of the invention, the control logic could throttle activity of the memory module to reduce the responsiveness of the memory module in the face of receiving more than a desired number of system commands per unit time and/or measured temperature levels or changes. In such a mode, the memory module would not be rendered dormant to system operations as in the previously described aspect of the invention, but instead would merely limit memory module usage and allow the memory module to process only a predetermined number of system commands or remain at or below a certain operating temperature. For example, the control logic would cause a number of idle states to be observed to maintain memory module power consumption below a certain level.

According to another aspect of the invention, data packets summarizing the memory module's activity level are transmitted on the memory bus via the memory hub. The memory module activity level packet could be received by a memory controller or by a master memory hub disposed on another memory module. Selectively directing memory modules into a reduced power state can thereby be managed centrally by the system controller, the memory controller, or a master memory module equipped with a master module power management controller. The system controller or master module power management controller may also communicate power control data packets to other memory modules via the system bus and the other memory modules'memory hubs to direct those modules into reduced power states. The system controller or master module power management controller could direct the memory modules into a power saving mode such as a self-refresh mode, could throttle memory module activity to reduce responsiveness and reduce power consumption, or use another reduced power mode.

DETAILED DESCRIPTION OF THE INVENTION

Figure 3:
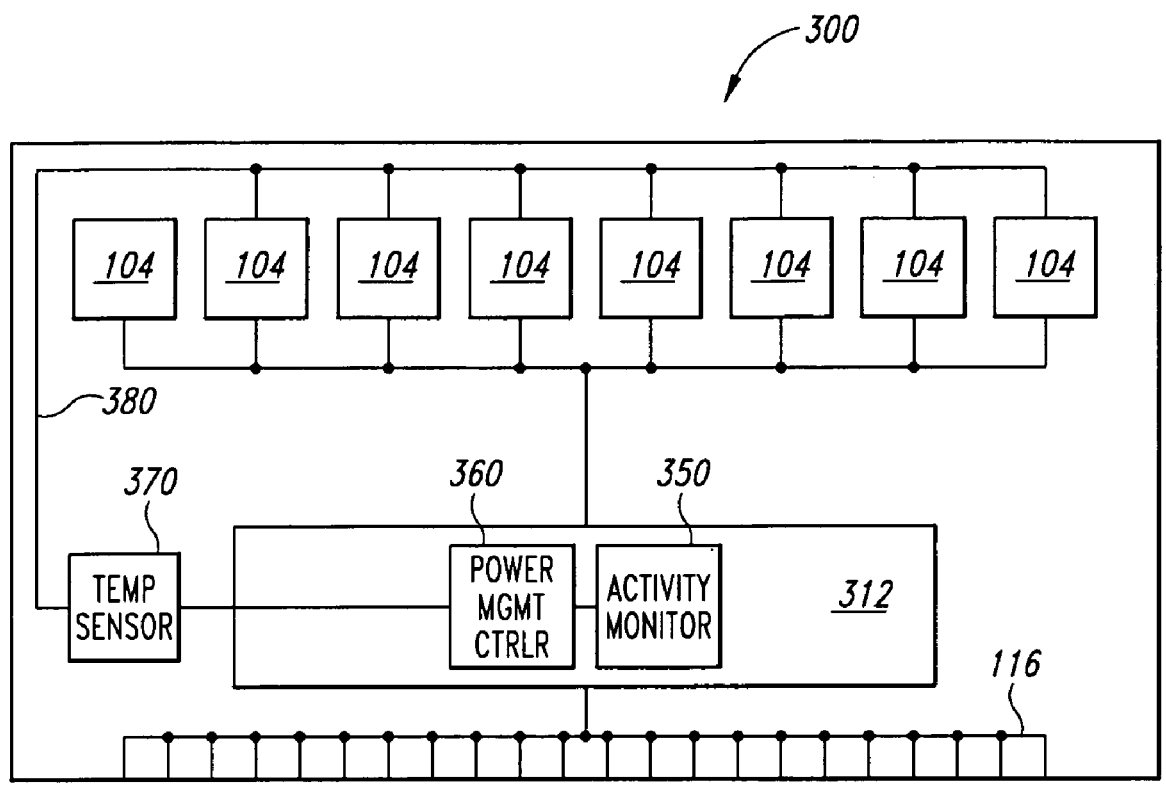
FIG. 3 is a plan view of a memory module equipped with power saving facilities of an embodiment of the present invention.

FIG. 3 shows a memory module 300 equipped with activity monitoring and power saving capabilities employing a first embodiment of the present invention. The memory module 300 comprises a plurality of memory devices 104 mounted on a substrate 108 through which the DRAM devices 104 are operably coupled to a memory hub 312 through communications lines 110 such as conductive traces or other similar signal carrying devices. The memory module shown in FIG. 3 comprises most of the same components used in the memory module shown in FIG. 1 thus, in the interest of brevity, these components have been provided with the same reference numerals, and an explanation of their functions and operations will not be repeated.

Figure 1:
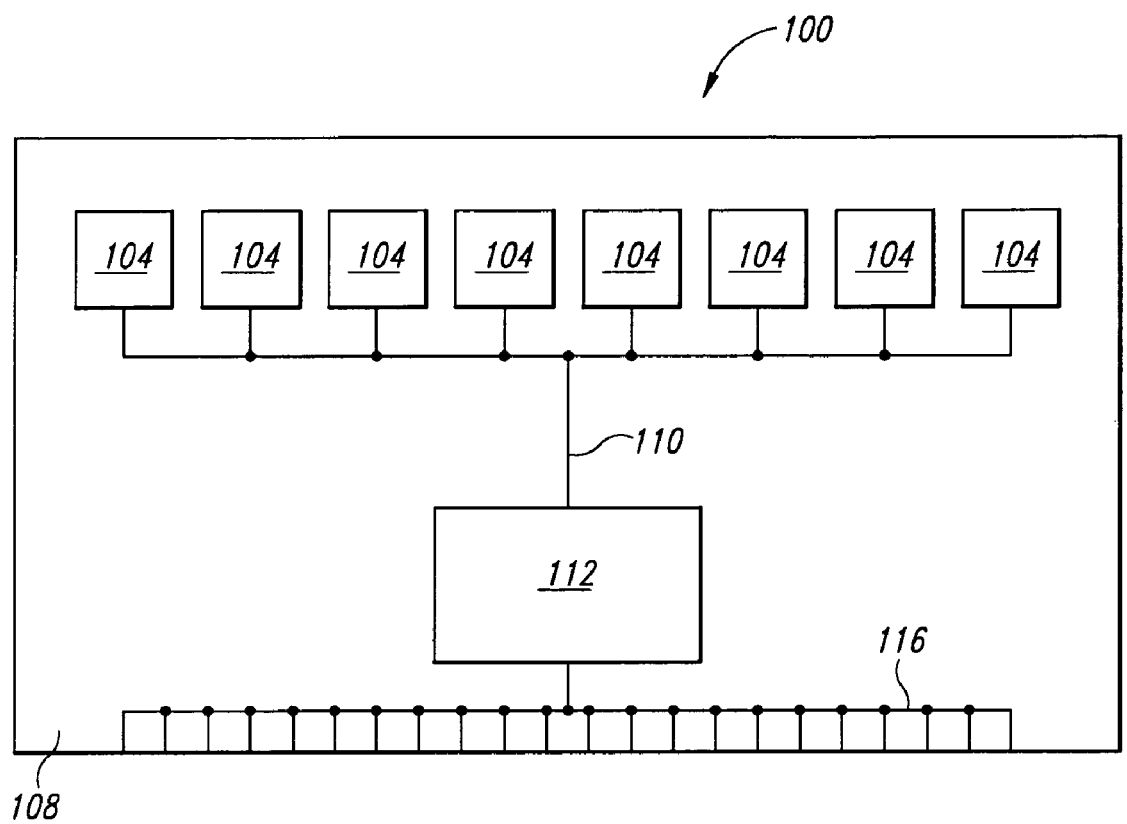
FIG. 1 is a plan view of a conventional memory module.
Figure 2:
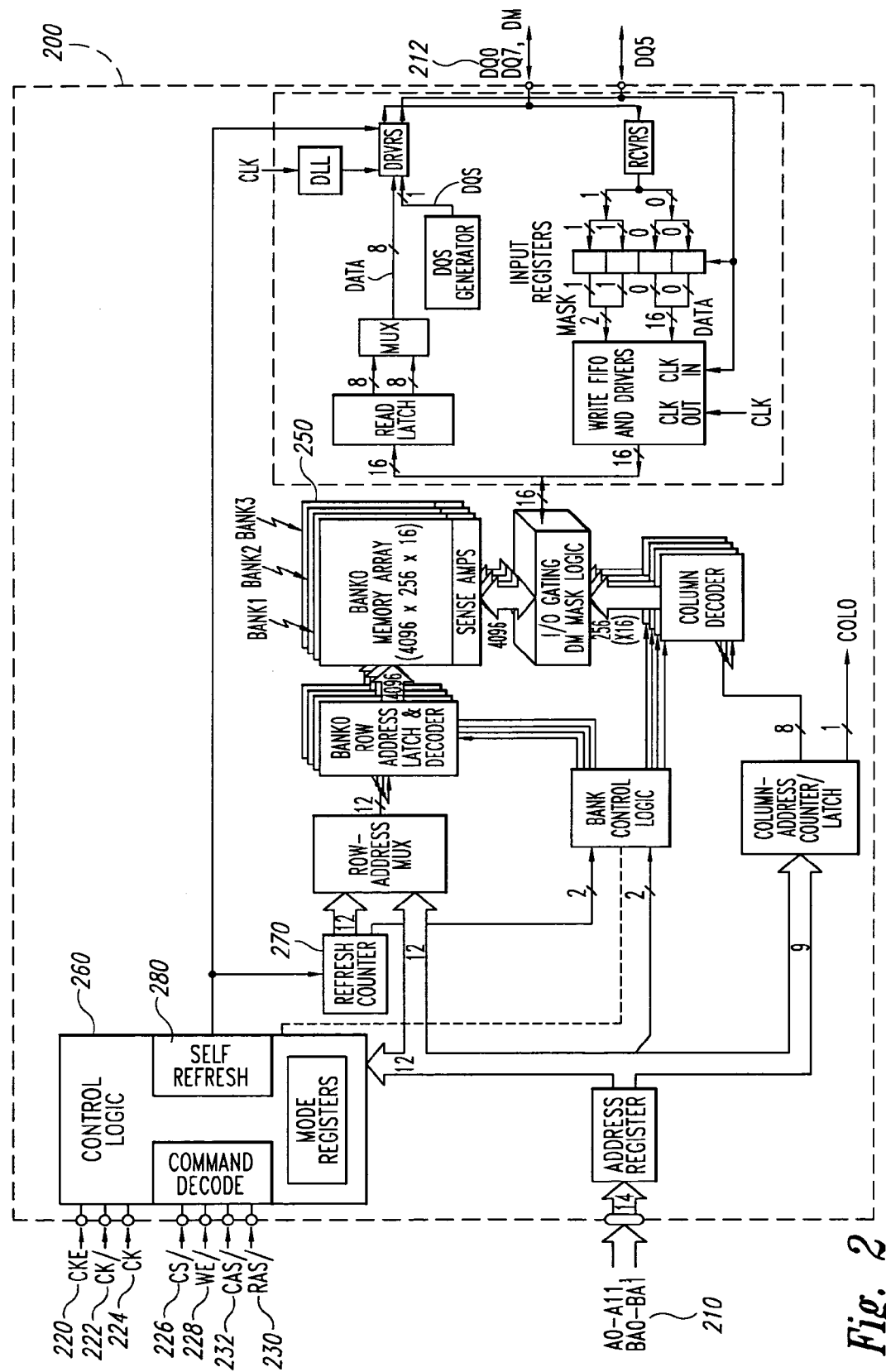
FIG. 2 is a block diagram of a conventional memory device equipped with self-refresh circuitry.

The memory module 300 shown in FIG. 3 comprises three additional devices not included in the conventional memory module of FIG. 1. The memory module 300 includes an activity monitor 350, a power management controller 360, and a temperature sensor 370, the last being connected to the memory devices 104 via a network of connections 380. Generally, the power management controller 360 monitors signals received from the activity monitor 350 and the temperature sensor 370 to determine whether the memory module 300 is active. If the memory module 300 is active, it is maintained at fully operational status. However, if the memory module 300 is not active, and the power management controller 360 can direct the memory module 300 to assume a reduced power consumption state. The activity monitor 350 actually tracks memory commands to the memory module 300, such as read and write requests to that module, to directly gauge whether the system is using the memory module. The temperature sensor 370 tracks the temperature of the memory devices 104 to indirectly measure whether the system is using the memory devices. As is known in the art, memory devices 104 actually being used consume more power and radiate more heat than memory devices 104 not being actively used, because additional circuitry is required to respond to memory commands than to merely continually refreshing the memory devices' own memory cells.

The power management controller 360, acting on input from the activity monitor 350 or the temperature sensor 370, can direct the memory module 300 into a reduced power mode when the memory module is inactive. For example, the memory module 300 might be inactive if it represents a portion of memory configured to be at the upper end of the system memory, and the user is not running applications requiring enough memory to load programs or data into that portion of memory. Alternatively, the memory devices 104 on the memory module 300 might have been loaded with programs and data the user is not actively using. For example, the memory devices 104 on the memory module 300 might have been loaded with a word processing document the user opened and has left idle in an open window, while the user works with a program loaded into memory devices on other memory modules (not shown). In addition, the user may have stopped using the system altogether for a few moments, resulting in none of the contents stored in the memory devices 104 and memory modules actively being used for a time. Such examples of lack of activity may signal that these memory devices 104 could be directed into a power saving state. The activity monitor 350 might count memory commands directed to the memory module 300, and after counting a predetermined number of clock cycles corresponding to a preselected time interval without a memory command, the activity monitor 350 could signal the power management controller 360 that the memory module 300 could assume a lower power consumption state.

In FIG. 3, the activity monitor 350 and the power management controller 360 are shown as being a part of the memory hub 312. Because memory commands would be received by the memory hub 312, it is a logical choice to incorporate the device monitoring system activity, the activity monitor 350, within the memory hub 312 itself. Similarly, because the memory hub 312 is in communication with the memory devices 104, it is a logical choice to include the power management controller 360 in the memory hub as well. However, the activity monitor 350 and/or the power management controller 360 can alternatively be located elsewhere in the memory module 300. The temperature sensor 370 is shown in FIG. 3 as being external to the memory hub 312 and connected to each of the memory devices 104 through the network of connectors 380. This is one of a number of possible designs, as will be further described in connection with describing the operation of the temperature sensor 370.

In one embodiment, the activity monitor 350 (FIG. 3) might be a counter to track the number of clock cycles since the last memory request from the system. After a sufficiently large predetermined number of clock cycles has passed without a memory command, an overflow signal on the counter might signal to the power management controller 360 (FIG. 3) that this threshold has been reached. Reaching this threshold count could be taken as an indication that the system is not using the memory module 300 or, at least, not presently using any contents of the memory module.

In addition to directly monitoring memory commands, a memory module 300 equipped with this embodiment of the present invention also can determine system activity somewhat less directly by measuring the temperature of the memory devices 104. As is well understood in the art, semiconductor devices such as memory devices consume power, some of which is lost to waste heat, with the more activity taking place in the device, the greater the amount of heat generated. As is known in the art, when a device is actively being used, more gates and other circuits in the device will be switching; the more circuits that are switching, the more power the device draws, and more heat is generated. To give an example, in a memory device 104, refreshing the memory array in a system-directed, ordinary auto-refresh mode consumes less power than the same semiconductor device actually processing memory commands, and therefore generates less heat.

The temperature sensor 370 can be deployed in a number of different ways. As shown in FIG. 3, the temperature sensor 370 is connected to each of the memory devices 104 through a network of communicative connections. The memory devices 104 can each be equipped with a temperature sensor device which communicates an electrical signal to the temperature sensor 370, which can discern an average temperature level across the array memory devices 104. Alternatively, the temperature sensor 370 could be connected to one memory device 104 or a number of representative memory devices 104, taking the operating temperature of that sampling of memory devices 104 as being indicative of the operating temperature of each of the memory devices 104. In addition, the temperature sensor 370 could measure the temperature of the substrate 108, which would change in response to the heat generated by the memory devices 104 as their activity level varies.

The temperature sensor 370 will compare the measured temperature to a predetermined threshold temperature. This temperature can be specified as an absolute value, as an absolute value relative to an ambient system temperature which might be measured by or communicated to the temperature sensor 370, or as a differential measured from an operating temperature reached by the memory module 300 once it has become fully operational. Alternatively, the temperature sensor 370 could be programmed to respond to a combination of factors, for example, when the temperature falls below a predetermined threshold and when that temperature represents a predetermined differential from a previously measured operating temperature. Once the temperature sensor 370 detects that the threshold or thresholds have been reached, the temperature sensor 370 might signal the power management controller 360 that the temperature level indicates the memory module 300 has not been actively used, and could assume a reduced power state.

Figure 4:
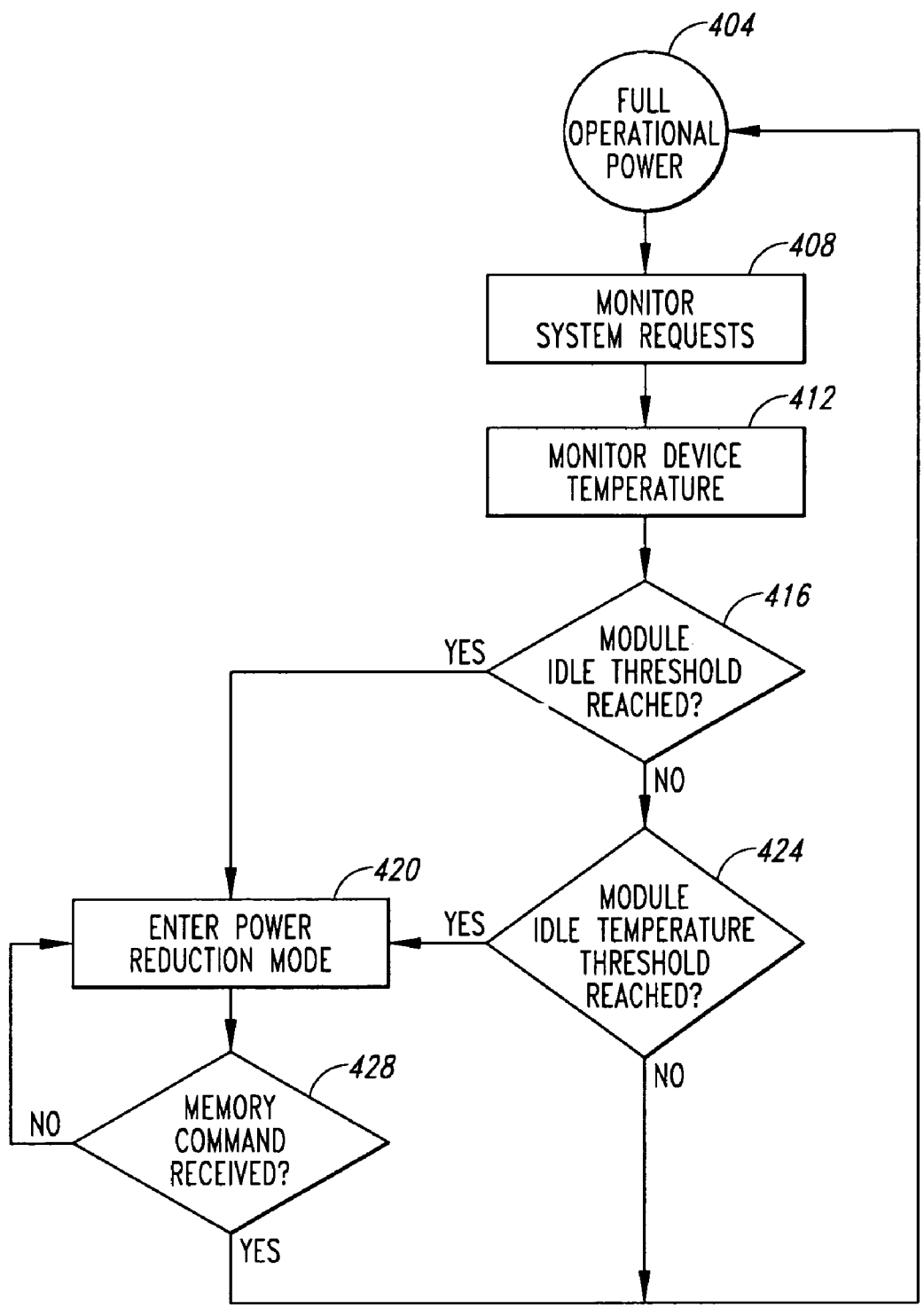
FIG. 4 is a flowchart showing the power saving operations of a memory module equipped with an embodiment of the present invention.

As mentioned above, the power management controller 360 receives signals from the activity monitor 350 and the temperature sensor 370 and, responsive to those signals, determines when the memory module might be directed to a reduced power state and restored to fully operational status. FIG. 4 flowcharts the operation of the invention the power management controller 360 (FIG. 3), the activity monitor 350, and the temperature sensor 370. Starting with the memory module 300 (FIG. 3) at operational status and consuming a full quantity of power from a system start or other fully operational status at 404, the activity monitor 350 (FIG. 3) is engaged to monitor memory commands issued to the memory module 300 (FIG. 3) at 408 (FIG. 4) as previously described. The temperature sensor 370 (FIG. 3) also is engaged to monitor the operating temperature of the memory devices (FIG. 3) at 412 (FIG. 4) on the module as previously described.

From the time these devices are engaged, the power management controller 360 (FIG. 3) continuously monitors the signals received from these devices. If the number of memory commands received continues to indicate that the memory module 300 (FIG. 3) is in regular, active use at 416 (FIG. 4), and the operating temperature of the memory devices 104 (FIG. 3) continues to indicate the same at 424 (FIG. 4), the power management controller 360 (FIG. 3) maintains the memory module at full operational status and power. Nonetheless, as shown in FIG. 4, the memory management controller 360 continues to monitor the status of these signals.

On the other hand, if the activity monitor 350 (FIG. 3) signals that no memory commands have been received for a period reaching an idle threshold at 416, or the temperature level indicates that the memory module 300 (FIG. 3) has not been actively used at 424 (FIG. 4), the power management controller 360 (FIG. 3) may direct the memory module 300 into a reduced power mode at 420 (FIG. 4). As previously described, this power reduction state might be a self-refresh mode during which the memory devices 104 (FIG. 3) are effectively isolated from the system and thus can be refreshed at a reduced rate, saving power. The memory module 300 can continue in this reduced power state until a memory command is received at 428 (FIG. 4) as detected by the activity monitor 350 (FIG. 3). Upon receiving such a memory command, the memory module 300 can resume its fully operational power status at 404 (FIG. 4), resetting the activity monitor 350 (FIG. 3) and/or the temperature sensor 370 to await the next time when the memory module 300 becomes idle and can assume a reduced power mode.

Although power saving techniques for memory systems such as self-refresh are currently known and used in computer systems, one of the advantages of embodiments of the present invention is that such techniques can be applied selectively. Conventionally, power-saving techniques are implemented across the entire system when a system user manually directs the system into a standby mode, or when the system automatically transitions into a standby mode after a predetermined period of inactivity. Embodiments of the present invention, however, allow for reaping these power savings while a system is operating. As a result, embodiments of the present invention can extend the actual operating time of electronic aids employing such memory devices.

It should be understood that use of the self-refresh mode is not the only possible way that embodiments of the present invention can be used to save power in memory systems. To name one example, the power management controller 360 (FIG. 3), through its associated activity monitor 350, might detect that no data has been loaded into the memory devices 104 of the memory module 300. If the memory module 300 is completely idle, as might be the case when the user is not running sufficient applications to fully utilize the system memory, the memory devices 104 could be powered off, along with the temperature sensor 370 and other devices. As long as the memory hub 312 and the power management controller 360 in the present example were left powered on to detect a memory command directed to the memory module 300 and so that the memory devices 104 and other dormant devices can be powered on again, further power can be saved. Similarly, a memory module 300 whose memory devices 104 store contents that have been long dormant could dump their contents to disk storage or other storage, and power down the devices. Upon receiving a memory command, the contents could be restored from disk to memory, allowing the user to continue the application from where she last was. Windows 2000® incorporates a "hibernate" mode that allows the entire system to shut down in this manner, allowing for a quick restart. However, as with other power saving facilities currently in use, the "hibernate" mode is an all-or-nothing, system wide shut down, and not applied selectively to some or all of the memory devices, as could be using embodiments of the present invention.

Alternatively, rather than direct the memory module 300 into an inactive state, the power management controller 360 can "throttle" the activity of the memory module 300 to system commands to limit power consumption. Instead of directing the memory module 300 into a nonfunctional state, such as a self-refresh state, throttling activity of the memory module 300 will reduce the responsiveness of the memory module 300 to keep its power consumption at or below a desired level. The power management controller 360 may be directed to restrict the number of system commands processed by the memory module 300 per unit time, mandating a certain number of idle intervals pass after one or a number of system commands have been processed per unit time. In one embodiment, the power management controller 360 may be programmed to always respond to a first system command or a first number of system commands, then insert a requisite number of idle intervals to contain power consumption. Alternatively, the power management controller 360 might evaluate power consumption by monitoring device temperatures, correlating a certain temperature level or change of temperature with exceeding a desired level of power consumption. As in the case of the power management controller 360 monitoring system requests, after the power management controller 360 measures a certain temperature level or change, the power management controller 360 can mandate a number of idle states, during which power consumption and, therefore, device temperature will decrease. Throttling the activity of the memory module 300 in this way, its power consumption can be reduced without actually rendering the memory module 300 at least temporarily inactive, as in the case of directing the memory module 300 into self-refresh mode.

Figure 5:
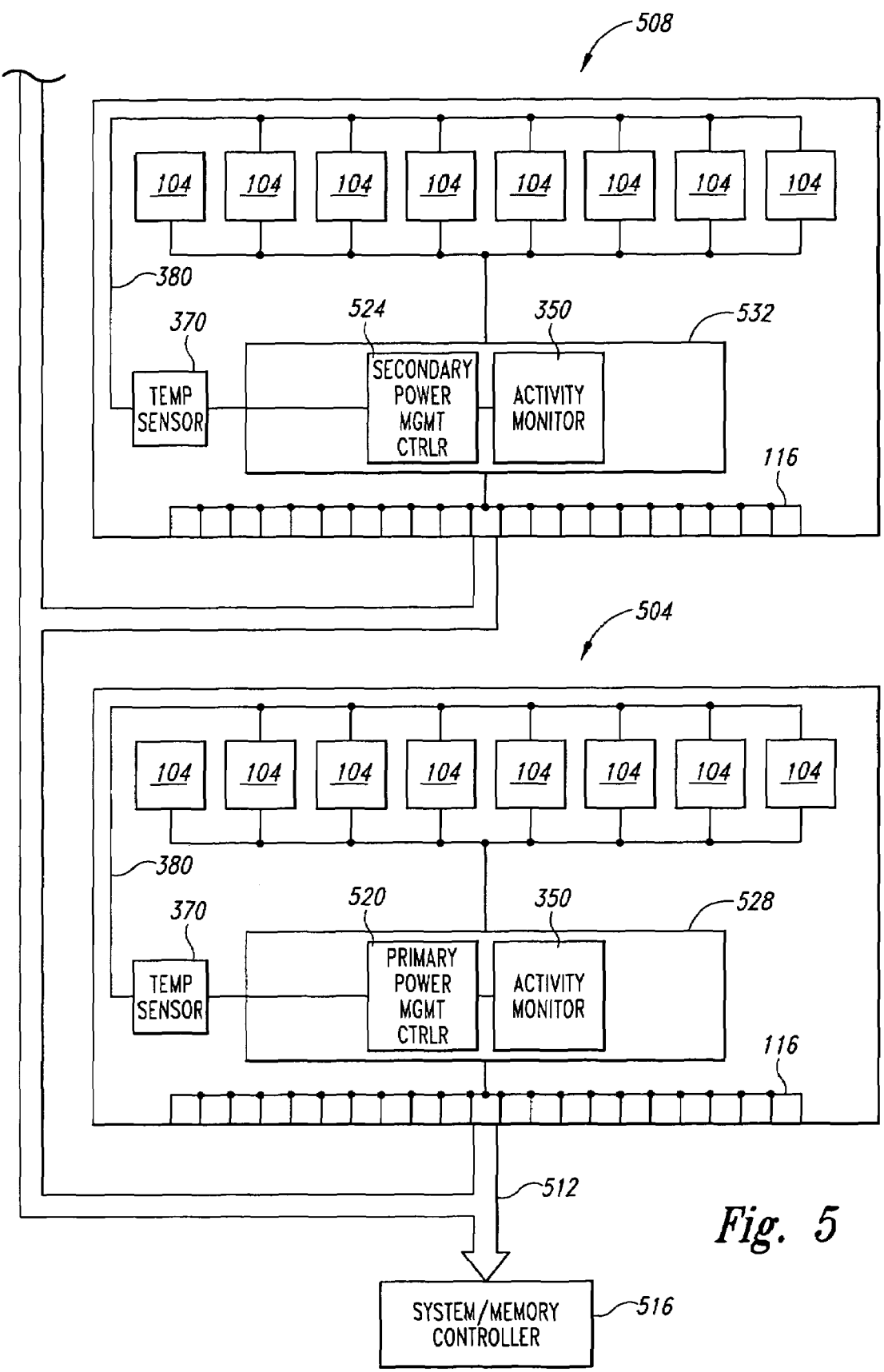
FIG. 5 is a plan view of a plurality of memory modules equipped with activity monitoring capabilities and communicating activity packets on the memory bus to a master power controller of another embodiment of the present invention.

Another embodiment of the present invention is shown in FIG. 5. FIG. 5 shows a network of two memory modules 504 and 508 coupled with a memory bus 512 to a system controller or memory controller 516. The memory modules 504 and 508 are nearly identical to the memory module 300 shown in FIG. 3, each having one difference. Memory module 504, positioned closest to the system/memory controller 516 is installed as the primary, low address memory module, and its memory hub 528 includes a primary power management controller 520. The memory hub 532 of memory module 508 includes a secondary power management controller 524. The primary power management controller 520 and the secondary power management controller 524 operate in a master/slave arrangement. Information about the activity in the secondary memory module 508 is relayed through the memory hub 532 over the system bus 512 to the primary memory module 504 and the primary power management controller 520. Similar to the operations of the memory module 300 of FIG. 3, the primary power management controller 520 also receives information about its own activity level.

Responsive to information received about its own activity level, the activity level of the secondary memory module 508, and any other memory modules (not shown) associated with the system, the primary power management controller 520 determines whether its own devices, those on the secondary memory module 508, or any other memory modules (not shown) should be directed to a reduced power state. As will be appreciated, these control decisions are made by the primary power management controller 520 just as they were made by the power management controller 360 of the memory module 300 of FIG. 3, which, for example, were based on activity level as reflected in actual system usage of these memory modules or by temperature levels reflecting the level of device activity. The primary power management controller 520 directs devices on the secondary memory module 508 by transmitting a control packet through its memory hub 528 via the system bus 512 to the secondary power management controller 524. On receiving a reduced power directive, the secondary power management controller 524 directs devices on the memory module to a reduced power state, whether that be a self-refresh state, a powered off state, a throttling or reduced response mode as previously described, or another reduced power state.

It will be appreciated that, in such a centralized control system, all the same power saving techniques could be employed. Memory devices 104 could be directed into a reduced power mode. Alternatively, the memory devices 104 and other devices could be powered off entirely if unused, or after having long dormant contents archived, both as previously described. As long as devices on the secondary memory module 508 remain active such that the secondary memory module 508 can be reactivated when memory commands to the secondary memory module are received, power can be saved in avoiding refreshing empty or long-unused and archived data.

Figure 6:
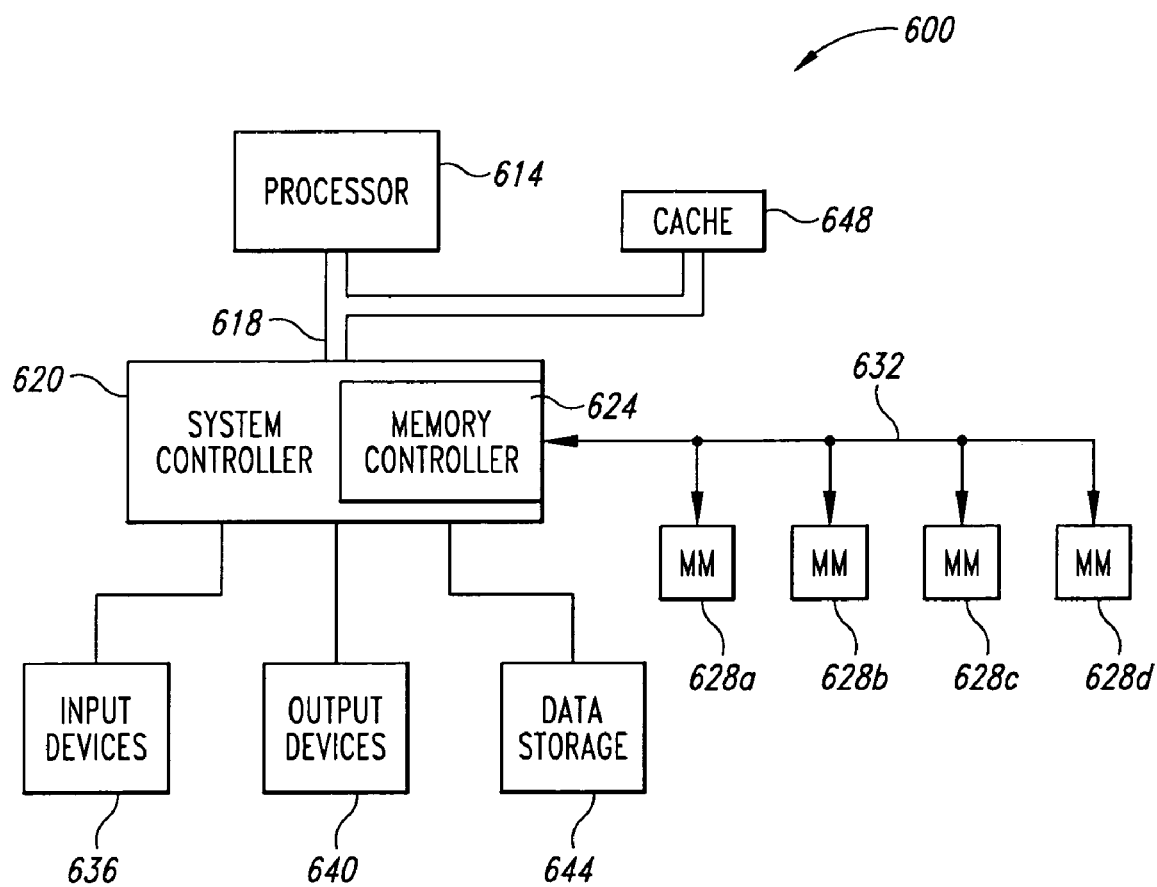
FIG. 6 is a block diagram of a computer system employing an embodiment of the present invention.

A computer system 600 using the memory modules 300 of FIG. 3 or 504 and 508 of FIG. 5 according to examples of the present invention are shown in FIG. 6. The computer system 600 includes a processor 614 for performing various computing functions, such as executing specific software to perform specific calculations or tasks. The processor 614 includes a processor bus 618 that normally includes an address bus, a control bus, and a data bus. The computer system 600 includes a system controller 620 that is coupled to the processor bus 618. The system controller 620 also includes a memory controller 624, which is, in turn, coupled to memory modules 628a, 628b, 628c, and 628d through a system bus 632. It will be appreciated that that the controller 624 may be external to the system controller 620 and coupled to it or some other component in the computer system 600, such as the processor 614.

In addition, the computer system 600 includes one or more input devices 636, such as a keyboard or a mouse, coupled to the processor 614 through the system controller 620 to allow an operator to interface with the computer system 600. Typically, the computer system 600 also includes one or more output devices 640 coupled to the processor 614 through the system controller 620, such output devices typically being a printer or a video terminal. One or more data storage devices 644 are also typically coupled to the processor 614 through the system controller 620 to allow the processor 614 to store data or retrieve data from internal or external storage media (not shown). Examples of typical storage devices 640 include hard and floppy disk drives, removable large capacity disk drives, tape cartridge drives, removable flash EEPROM storage devices, and compact disc (CD) read-only, writeable, and rewriteable drives. The processor 614 is also typically coupled to cache memory 648, which is usually static random access memory ("SRAM").

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A memory module, the memory module comprising:
    a plurality of memory devices;
    a memory hub operably coupled with the memory devices, the memory hub being configured for managing communications with the memory devices in response to memory commands received by the memory module;
    an activity sensing device coupled to the memory hub, the activity sensing device being configured to monitor activity of the memory module in processing the received memory commands and to generate an output corresponding thereto; and
    a module power controller coupled to the activity sensing device and being operable to direct the memory devices in the memory module to a reduced power state responsive to the output of the activity sensing device.

2. The memory module of claim 1 wherein the module power controller directs the memory module to the reduced power state when the activity sensing device indicates memory module activity has fallen below a desired level.

3. The memory module of claim 1 wherein the module power controller directs the memory module to the reduced power state when the activity sensing device indicates memory module activity has exceeded a desired level.

4. The memory module of claim 1 wherein the module power controller is operable to determine when the memory module should be directed to the reduced power state responsive to the output of the activity sensing device.

5. The memory module of claim 1 wherein the module power controller is operable to direct the memory module to the reduced power state upon receiving an external reduced power signal.

6. The memory module of claim 1 wherein the module power controller comprises a master power controller, the master power controller receiving the output of the activity sensing device from at least one other memory module and, responsive to the output of the activity sensing device indicating activity of the memory module is not of a desired level, generates an external reduced power signal to direct the at least one other memory module to the reduced power state.

7. The memory module of claim 1 wherein the memory module is directed to the reduced power state by the module power controller responsive to a single indication the activity of the memory module is not of a desired level reflected in the output of the activity sensing device.

8. The memory module of claim 1 wherein the memory module is directed to the reduced power state by the module power controller responsive to a plurality of indications the activity of the memory module is not of a desired level reflected in the output of the activity sensing device.

9. The memory module of claim 1 wherein the memory module is directed to the reduced power state by the module power controller when the output of the activity sensing device indicates the memory module has not received memory commands for a predetermined time period.

10. The memory module of claim 1 wherein the activity sensing device comprises an activity monitor that monitors memory commands directed to the memory module.

11. The memory module of claim 10 wherein the activity monitor monitors the memory commands received by the memory module.

12. The memory module of claim 10 wherein the activity monitor comprises part of the memory hub.

13. The memory module of claim 1 wherein the activity sensing device comprises a temperature sensor wherein the temperature sensor is operable to measure when the activity of the memory module is not of a desired level by monitoring temperature.

14. The memory module of claim 13 wherein the temperature sensor is operably coupled with at least one memory device to measure a memory device operating temperature.

15. The memory module of claim 13 wherein the temperature sensor is operably coupled with each of the memory devices to measure an aggregate memory device temperature.

16. The memory module of claim 13 wherein the temperature sensor is operably coupled with the memory hub to measure a memory hub operating temperature.

17. The memory module of claim 13 wherein the temperature sensor further comprises an ambient temperature sensor so that a measured temperature of the memory module can be compared to an ambient temperature.

18. The memory module of claim 1 wherein the plurality of memory devices comprise a plurality of DRAM devices.

19. The memory module of claim 18 wherein the reduced power state comprises a reduced refresh state in which memory cells of the DRAM devices are refreshed less frequently.

20. The memory module of claim 19 wherein the reduced refresh state comprises a self-refresh state.

21. The memory module of claim 1 wherein the reduced power state is a reduced response mode in which the module power controller limits response of the memory module to memory commands to control power consumption by the memory module.

22. The memory module of claim 21 wherein the module power controller limits the response of the memory module to memory commands by mandating idle intervals between responses to memory commands by the memory module.

23. The memory module of claim 21 wherein the output of the activity sensing device communicates that the memory devices of the memory module currently store no programming instructions and data, and the power management controller causes a plurality of devices of the memory module to be powered off.

24. The memory module of claim 1 wherein the output of the activity sensing device communicates that the memory devices of the memory module currently store programming information that has not been accessed for an extended period, and the power management controller causes the contents of the memory devices to be saved to a storage device and a plurality of devices of the memory module to be powered off.

25. A memory system, comprising:
a memory controller;
a memory bus operably coupled with the memory controller to communicate memory commands from the memory controller and communicate memory output signals to the memory controller; and
a plurality of memory modules operably coupled with the memory bus, the memory modules generating the memory output signals responsive to the memory commands, at least one of the memory modules comprising:
a plurality of memory devices;
a memory hub operably coupled with the memory devices and, the memory hub being configured to manage communications with the memory devices in response to memory commands received by the memory module;
an activity sensing device coupled to the memory hub, the activity sensing device being configured to monitor activity of the memory module in processing memory commands and to generate an output corresponding thereto; and
a module power controller coupled to the activity sensing device and being operable to direct the memory module to a reduced power state responsive to the output of the activity sensing device.

26. The memory system of claim 25 wherein the module power controller directs the memory module to the reduced power state when the activity sensing device indicates memory module activity has fallen below a desired level.

27. The memory system of claim 25 wherein the module power controller directs the memory module to the reduced power state when the activity sensing device indicates memory module activity has exceeded a desired level.

28. The memory system of claim 25 wherein the module power controller is operable to determine when the memory module should be directed to the reduced power state responsive to the output of the activity sensing device.

29. The memory system of claim 25 wherein the module power controller is operable to direct the memory module to the reduced power state upon receiving an external reduced power signal.

30. The memory system of claim 25 wherein the module power controller of one of the memory modules comprises a master power controller, the master power controller receiving the output of the activity sensing device from at least one other memory module and, responsive to the output of the activity sensing device indicating activity of the memory module is not of a desired level, generates an external reduced power signal to direct the at least one other memory module to the reduced power state.

31. The memory system of claim 25 wherein the memory controller comprises a master power controller, the master power controller receiving the output of the activity sensing device from at least one other memory module and, responsive to the output of the activity sensing device indicating indicating activity of the memory module is not of a desired level, generates an external reduced power signal to direct the at least one other memory module to the reduced power state.

32. The memory system of claim 25 wherein the memory module is directed to the reduced power state by the module power controller responsive to a single indication the activity of the memory module is not of a desired level reflected in the output of the activity sensing device.

33. The memory system of claim 25 wherein the memory module is directed to the reduced power state by the module power controller responsive to a plurality of indications the activity of the memory module is not of a desired level reflected in the output of the activity sensing device.

34. The memory system of claim 25 wherein the memory module is directed to the reduced power state by the module power controller when the output of the activity sensing device indicates the memory module has not received a desired number of memory commands for a predetermined time period.

35. The memory system of claim 25 wherein the activity sensing device comprises an activity monitor that monitors memory commands directed to the memory module.

36. The memory system of claim 35 wherein the activity monitor monitors the received memory commands.

37. The memory system of claim 25 wherein the activity monitor comprises part of the memory hub.

38. The memory system of claim 25 wherein the activity sensing device comprises a temperature sensor wherein the temperature sensor is operable to measure when the activity of the memory module is not of a desired level by monitoring temperature.

39. The memory system of claim 38 wherein the temperature sensor is operably coupled with at least one memory device to measure a memory device operating temperature.

40. The memory system of claim 38 wherein the temperature sensor is operably coupled with each of the memory devices to measure an aggregate memory device temperature.

41. The memory system of claim 38 wherein the temperature sensor is operably coupled with the memory hub to measure a memory hub operating temperature.

42. The memory system of claim 38 wherein the temperature sensor further comprises an ambient temperature sensor so that a measured temperature of the memory module can be compared to an ambient temperature.

43. The memory system of claim 25 wherein the plurality of memory devices comprise a plurality of DRAM devices.

44. The memory system of claim 43 wherein the reduced power state comprises a reduced refresh state in which memory cells of the DRAM devices are refreshed less frequently.

45. The memory system of claim 44 wherein the reduced refresh state comprises a self-refresh state.

46. The memory system of claim 25 wherein the reduced power state is a reduced response mode in which the module power controller limits response of the memory module to memory commands to control power consumption by the memory module.

47. The memory module of claim 46 wherein the module power controller limits the response of the memory module to memory commands by mandating idle intervals between responses to memory commands by the memory module.

48. The memory system of claim 25 wherein the output of the activity sensing device communicates that the memory devices of the memory module currently store no programming instructions and data, and the power management controller causes a plurality of devices of the memory module to be powered off.

49. The memory system of claim 25 wherein the output of the activity sensing device communicates that the memory devices of the memory module currently store programming information that has not been accessed for an extended period, and the power management controller causes the contents of the memory devices to be saved to a storage device and a plurality of devices of the memory module to be powered off.

50. A computer system, comprising:
a processor;
an input device, operably connected to the processor;
an output device, operably connected to the processor; and
a memory system, operably coupled with the processor, the memory system comprising:
  a memory controller;
  a memory bus operably coupled with the memory controller to communicate memory commands from the memory controller and communicate memory output signals to the memory controller; and
  a plurality of memory modules operably coupled with the memory bus, the memory modules generating the memory output signals responsive to the memory commands, at least some of the memory modules comprising:
    a plurality of memory devices;
    a memory hub operably coupled with the memory devices and the processor, the memory hub being configured for managing communications between the memory devices and the processor in response to memory commands received by the memory module;
    an activity sensing device coupled to the memory hub, the activity sensing device being configured to monitor activity of the memory module in processing memory commands and to generate an output corresponding thereto; and
    a module power controller coupled to the activity sensing device and being operable to direct the memory module to a reduced power state responsive to the output of the activity sensing device.

51. The computer system of claim 50 wherein the module power controller directs the memory module to the reduced power state when the activity sensing device indicates memory module activity has fallen below a desired level.

52. The computer system of claim 50 wherein the module power controller directs the memory module to the reduced power state when the activity sensing device indicates memory module activity has exceeded a desired level.

53. The computer system of claim 50 wherein the module power controller is operable to determine when the memory module should be directed to the reduced power state responsive to the output of the activity sensing device.

54. The computer system of claim 50 wherein the module power controller is operable to direct the memory module to the reduced power state upon receiving an external reduced power signal.

55. The computer system of claim 50 wherein the module power controller of one of the memory modules comprises a master power controller, the master power controller receiving the output of the activity sensing device from at least one other memory module and, responsive to the output of the activity sensing device activity of the memory module is not of a desired level, generates an external reduced power signal to direct the at least one other memory module to the reduced power state.

56. The computer system of claim 50 wherein the memory controller comprises a master power controller, the master power controller receiving the output of the activity sensing device from at least one other memory module and, responsive to the output of the activity sensing device indicating activity of the memory module is not of a desired level, generates an external reduced power signal to direct the at least one other memory module to the reduced power state.

57. The computer system of claim 50 wherein the memory module is directed to the reduced power state by the module power controller responsive to a single indication activity of the memory module is not of a desired level reflected in the output of the activity sensing device.

58. The computer system of claim 50 wherein the memory module is directed to the reduced power state by the module power controller responsive to a plurality of indications activity of the memory module is not of a desired level reflected in the output of the activity sensing device.

59. The computer system of claim 50 wherein the memory module is directed to the reduced power state by the module power controller when the output of the activity sensing device indicates the memory module has not received a desired number of memory commands for a predetermined time period.

60. The computer system of claim 50 wherein the activity sensing device comprises an activity monitor that monitors memory commands directed to the memory module.

61. The computer system of claim 60 wherein the activity monitor monitors the received memory commands.

62. The computer system of claim 60 wherein the activity monitor comprises part of the memory hub.

63. The computer system of claim 50 wherein the activity sensing device comprises a temperature sensor wherein the temperature sensor is operable to measure when the activity of the memory module is not of a desired level by monitoring temperature.

64. The computer system of claim 63 wherein the temperature sensor is operably coupled with at least one memory device to measure a memory device operating temperature.

65. The computer system of claim 63 wherein the temperature sensor is operably coupled with each of the memory devices to measure an aggregate memory device temperature.

66. The computer system of claim 63 wherein the temperature sensor is operably coupled with the memory hub to measure a memory hub operating temperature.

67. The computer system of claim 63 wherein the temperature sensor further comprises an ambient temperature sensor so that a measured temperature of the memory module can be compared to an ambient temperature.

68. The computer system of claim 50 wherein the plurality of memory devices comprise a plurality of DRAM devices.

69. The computer system of claim 68 wherein the reduced power state comprises a reduced refresh state in which memory cells of the DRAM devices are refreshed less frequently.

70. The computer system of claim 69 wherein the reduced refresh state comprises a self-refresh state.

71. The computer system of claim 50 wherein the reduced power state is a reduced response mode in which the module power controller limits response of the memory module to memory commands to control power consumption by the memory module.

72. The computer system of claim 50 wherein the module power controller limits the response of the memory module to memory commands by mandating idle intervals between responses to memory commands by the memory module.

73. The computer system of claim 50 wherein the output of the activity sensing device communicates that the memory devices of the memory module currently store no programming instructions and data, and the power management controller causes a plurality of devices of the memory module to be powered off.

74. The computer system of claim 50 wherein the output of the activity sensing device communicates that the memory devices of the memory module currently store programming information that has not been accessed for an extended period, and the power management controller causes the contents of the memory devices to be saved to a storage device and a plurality of devices of the memory module to be powered off.

75. A method of controlling power used in a plurality of memory modules associated with a system, the method comprising:
    individually measuring activity in response to memory commands from the system in a plurality of the memory modules;
    determining at least one memory module exceeded a predetermined power consumption; and
    mandating at least one idle interval after a response of the one memory module to a memory command, the act of mandating taken responsive to the determination that the one memory module exceeded the predetermined power consumption.

76. The method of claim 75 wherein determining the one module exceeded the predetermined power consumption and mandating the at least one idle interval occurs within the memory module.

77. The method of claim 75 wherein determining the one module exceeded the predetermined power consumption and mandating the at least one idle interval occurs in an outside control device outside the memory module responsive to activity of the memory module.

78. The method of claim 77 wherein the outside control device resides in a memory controller.

79. The method of claim 77 wherein the outside control device resides in a system controller.

80. The method of claim 77 wherein the outside control device resides in a master memory module.

81. The method of claim 77 wherein the outside control device for other memory modules resides within the memory module.

82. The method of claim 75 wherein determining the one module exceeded the desired power consumption is responsive to monitoring temperature within the memory module.

83. The method of claim 82 wherein determining the one module exceeded the desired power consumption is responsive to monitoring temperature of a memory device within the memory module.

84. The method of claim 82 wherein determining the one module exceeded the desired power consumption is responsive to monitoring temperature of each of the memory devices within the memory module.

85. The method of claim 82 wherein determining the one module exceeded the desired power consumption is responsive to monitoring temperature of a memory hub.

86. The method of claim 82 further comprising measuring an ambient temperature in comparison with temperature monitored within the memory module.

87. The method of claim 75 wherein the act of mandating at least one idle interval after a response of the one memory module to a memory command comprises mandating a plurality of idle intervals.

* * * * *

UNITED STATES PATENT AND TRADEMARK OFFICE
CERTIFICATE OF CORRECTION

| | | |
|---|---|---|
| PATENT NO. | : 7,437,579 B2 | Page 1 of 1 |
| APPLICATION NO. | : 11/433218 | |
| DATED | : October 14, 2008 | |
| INVENTOR(S) | : Jeddeloh et al. | |

It is certified that error appears in the above-identified patent and that said Letters Patent is hereby corrected as shown below:

In column 12, line 46, in Claim 31, before "activity" delete "indicating".

Signed and Sealed this

Twenty-fourth Day of March, 2009

JOHN DOLL
*Acting Director of the United States Patent and Trademark Office*